(12) United States Patent
Ni (10) Patent No.: US 7,915,528 B2
(45) Date of Patent: Mar. 29, 2011

(54) FACE SLIDE WEATHERPROOF ELECTRIC ENCLOSURE

(75) Inventor: Lidong Ni, Yueqing (CN)

(73) Assignee: Wenzhou MTLC Electric Appliances Co., Ltd., Yueqing, Zhejiang (CN)

( * ) Notice: Subject to any disclaimer, the term of this patent is extended or adjusted under 35 U.S.C. 154(b) by 455 days.

(21) Appl. No.: 12/152,538

(22) Filed: May 15, 2008

(65) Prior Publication Data
US 2009/0283291 A1 Nov. 19, 2009

(51) Int. Cl.
*H01H 9/02* (2006.01)
(52) U.S. Cl. ............... 174/53; 174/50; 174/57; 174/66; 220/3.2; 220/3.3
(58) Field of Classification Search .............. 174/480, 174/481, 50, 53, 57, 58, 66, 67; 220/3.2–3.9, 220/4.02, 241, 242; 439/535, 536
See application file for complete search history.

(56) References Cited

U.S. PATENT DOCUMENTS

| 3,530,230 | A | * | 9/1970 | Cormier et al. | 174/66 |
| 5,533,637 | A | * | 7/1996 | Williams, Jr. | 220/3.8 |
| 6,133,531 | A | * | 10/2000 | Hayduke et al. | 174/67 |
| 7,323,639 | B1 | * | 1/2008 | Shotey et al. | 174/66 |
| 7,462,777 | B2 | * | 12/2008 | Dinh | 174/58 |
| 7,763,799 | B2 | * | 7/2010 | Johnson | 174/67 |

* cited by examiner

*Primary Examiner* — Angel R Estrada
(74) *Attorney, Agent, or Firm* — Law Offices of Christine Yang (57) ABSTRACT

A weatherproof outlet enclosure is provided for connections between a number of electrical outlets and various electric loads comprising: at least one rectangular slider plate for replacing existing receptacle face plate in a gentle sliding way; a base plate for mating with a predetermined number of the slider plates which lock into place by a single click stop, and a cover having a hinged attachment to one of the side walls of the base plate and a latching connection with an opposite location of the side walls from the hinged attachment, the cover in its a lower latched position enclosing the electrical outlets leaving passages for up to four cords leading from the electric loads connected.

15 Claims, 6 Drawing Sheets

FACE SLIDE WEATHERPROOF ELECTRIC ENCLOSURE

BACKGROUND OF THE INVENTION

A. Field of the Invention

The present invention relates to an electric power fixture. More particularly, the present invention relates to an in-use weatherproof enclosure with interchangeable slider plates to additionally protect existing switch plates or power outlets at wet locations and outdoors.

B. Description of the Prior Art

One type of weatherproof cover for outdoor receptacles National Electrical Code specifies is a hooded cover that is weather resistant with or without plug inserted. With hooded cover a plug leading from various electric loads such as portable tools, landscape lighting, and holiday lights can be protected even when they are not attended during use. So, this type of enclosure is called "while in use" cover. U.S. Pat. No. 5,280,135 to Berlin et al. provides an advancement of such weatherproof cover that includes a base plate '12' placed on certain receptacle, an insert '14' of certain symmetrical form horizontally as well as vertically to easily conform to the existing receptacle in either vertical or horizontal orientation, and a housing hinged at its top to the base plate for an access to the protected space under cover.

Inserts of the Berlin patent are seated onto an inner diameter of a large aperture of a base plate to cover the conventional one or two-duplex receptacle outlet in two orientations in order to simplify manufacturing and save the associated cost. In the Berlin cover, the insert '14' is limited to have an octagonal, circular, or polygonal shape wherein only a relatively small portion of the insert area is actually used to provide the necessary aperture pattern that conforms to a standard outlet. However, it is customary to install the receptacles on upright walls in vertical orientation and it is more desirable to keep the case less bulky rather than making them oversized for the purpose of dual orientation.

In return for the dual orientation scheme, the outlet cover will overprotect above and below the horizontal receptacle or both lateral sides of the vertical receptacles and thus become resultantly bulky and may not work adequately with an existing receptacle in a tight space.

In addition, to make the same base plate and housing available to use for a double-gang variation of the Berlin cover, a different couple of insert parts should be devised to fit in the octagonal, circular, or polygonal aperture of the base plate resulting in an increase of the total number of insert shapes to prepare for the variety of dual receptacles. For example, a ground-fault circuit interrupter or GFCI insert for a single-gang and double-gang application should be differently formed. Rather than having a rigid base plate and housing to which the existing receptacle configurations are made to adapt, it would be desirable to provide a flexible construction system for enclosures with improved modular face plates that easily incorporates into individually fit frame of the enclosures to various receptacle shapes and orientations. Such face plates will be desirably swift and secure to interchange between them in the process of installing the enclosure.

Therefore, it is necessary to provide an improved receptacle enclosure that fits and reconfigured more flexibly to most wall receptacles than the above and other similar known modular enclosures.

In view of the foregoing, it is an object of the present invention to provide an improved weatherproof enclosure having modular slider face plates, which are standardized, faster and more flexible to cover one or multiple receptacles correctly.

Another object of the present invention to provide a weatherproof enclosure having a main frame that interconnects with modular slider plates more securely to facilitate handling the enclosure during installation.

SUMMARY OF THE INVENTION

A weatherproof outlet enclosure according to the present invention protects connections between a number of electrical outlets and various electric loads and comprises: (a) at least one rectangular slider plate having a front and rear surface, openings in its middle area for allowing access from the front surface to the electrical outlets and a click stop integrally formed on the slider plate; (b) a vertically elongated base plate for slidably accommodating a predetermined number of the slider plates which are held in position by the click stop, the base plate including four-sided rectangular walls which form a generally rectangular opening; at least one channel for guiding the slider plate; a rear rectangular edge lying flush on a flat wall surrounding the outlets and an opposite rectangular edge facing forward; and (c) a cover having a hinged attachment to one of the side walls of the base plate and a latching connection with an opposite location of the side walls from the hinged attachment, the cover also having an ascended position to allow access to the slider plate and thus the electrical outlets and a lower latched position to enclose the electrical outlets leaving passages for cords leading from the electric loads connected.

The slider plate has flat opposite side edges for making a parallel sliding assembly with the channel of the base plate and distinctive leading and trailing edges spanning the side edges. The slider plate is introduced into the base plate at a lower side of the four-sided rectangular walls. In order to ensure a fast assembly every time, the slider plate has a grasp bar formed on the rear surface at the trailing edge to correctly hold the slider plate for pushing it up into the main body. To position the right side forward, a positional indicator is also provided consisting of the two opposite side edges slightly shifted toward the front surface with respect to a main middle portion to form a deflected cross section that fits with the right side of the main body only.

Embodiments of the invention will now be described by way of example with reference to the accompanying drawings.

BRIEF DESCRIPTION OF THE DRAWINGS

FIG. 4 is a bottom view of the enclosure of FIG. 3 showing two large passages for up to four electric cords and two slots to which the face plates will slide in.

Similar reference numbers denote corresponding features throughout the attached drawings.

Between the two wickets 44 an eyelet 45 corresponding to eyelet 25 of main body 12 is depending from cover 30 to provide a hasp together for padlocking as a safety measure. Eyelet 25 of main body 12 is supported by two sidewalls 46 connecting it to bottom side 18. A latch 48 is resiliently cantilevered from main body 12 between sidewalls 46. At the counterpart area in cover 30, there is formed a mating step 50 on which latch 48 may snapped to keep cover 30 in tight engagement with main body 12 until latch 48 is pressed down out of engagement with step 50.

| | | |
|---|---|---|
| 10: Enclosure | 12: Main Body | 14: Receiving Area |
| 16: Top Side | 18: Bottom Side | 20: Lateral Side |
| 22: Rear End | 24: Front End | 25: Eyelet |
| 26: Recess | 28: Moisture Wall | 30: Cover |
| 32: Pivot Pin | 33: Leg | 34: Neck Section |
| 36: Hinge Portion | 38: Snap Bar | 40: Bridge |
| 42: Skirt | 44: Wicket | 45: Eyelet |
| 46: Sidewall | 48: Latch | 50: Step |
| 52: Side Rail | 54: Spine | 56: Left Slot |
| 58: Right Slot | 60: Rail Segment | 62: Sliding Channel |
| 64a, 64b: Slider Plate | 68: Lower Entrance | 70: Press Tab |
| 72: Recess | 73: Rear Tab | 74: Side Edge |
| 75: Middle Portion | 76: Auxiliary Screw Hole | 78: Primary Screw Hole |
| 80: Thru Hole | 82: Midway Tab | 84: Bump |
| 86: Grasp Bar | 88: Matching Hole | 90: Gasket |
| 100: Single Gang Enclosure | 102: Main Body | 104: Slider Plate |
| 106: GFCI Opening | 124: Front End | |

DETAILED DESCRIPTION OF THE PREFERRED EMBODIMENT

Figure 1:
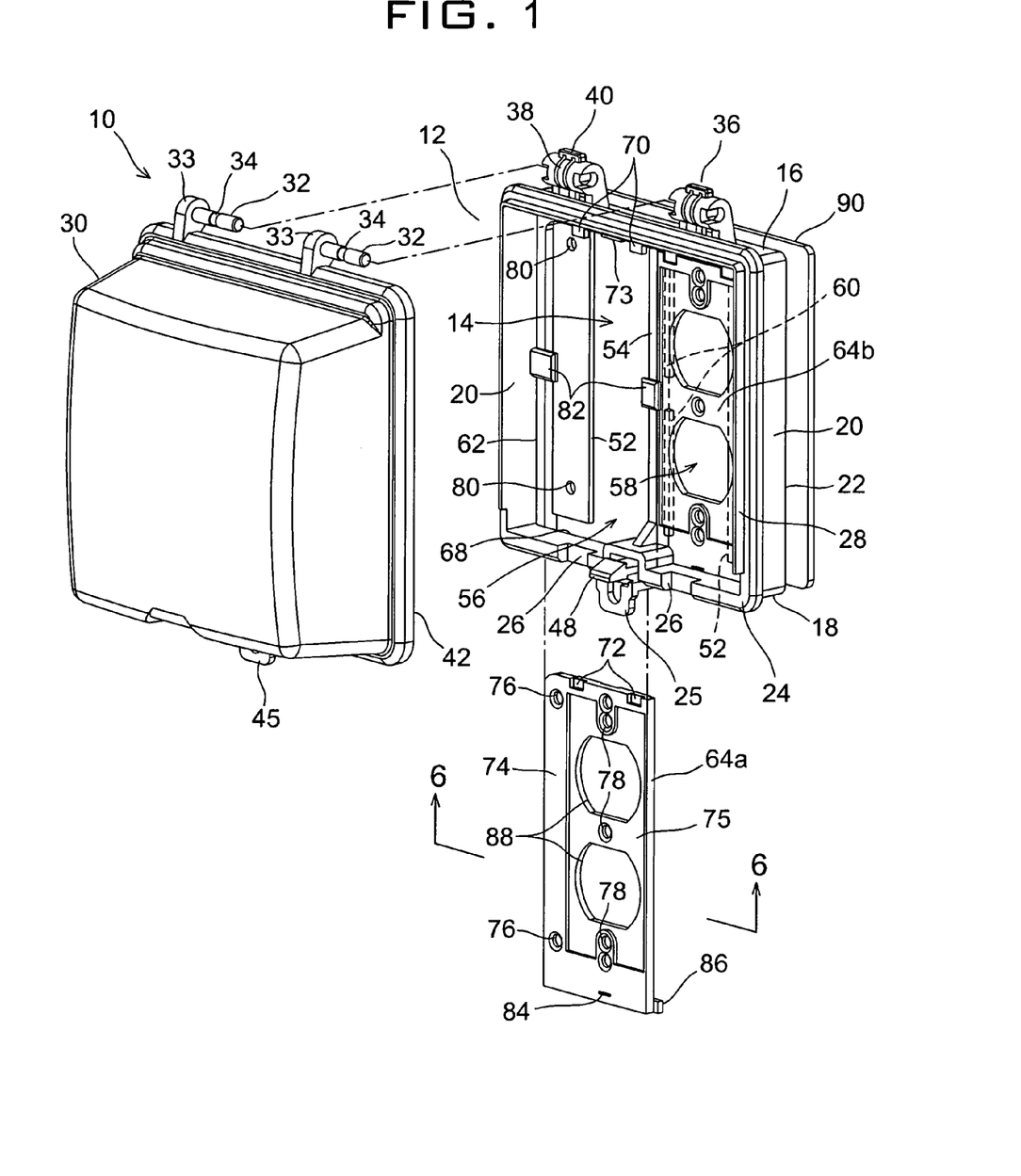
FIG. 1 is an exploded perspective view of a weatherproof outlet enclosure with a cover and left one of two slider face plates drawn out according to a first embodiment of the present invention.
Figure 2:
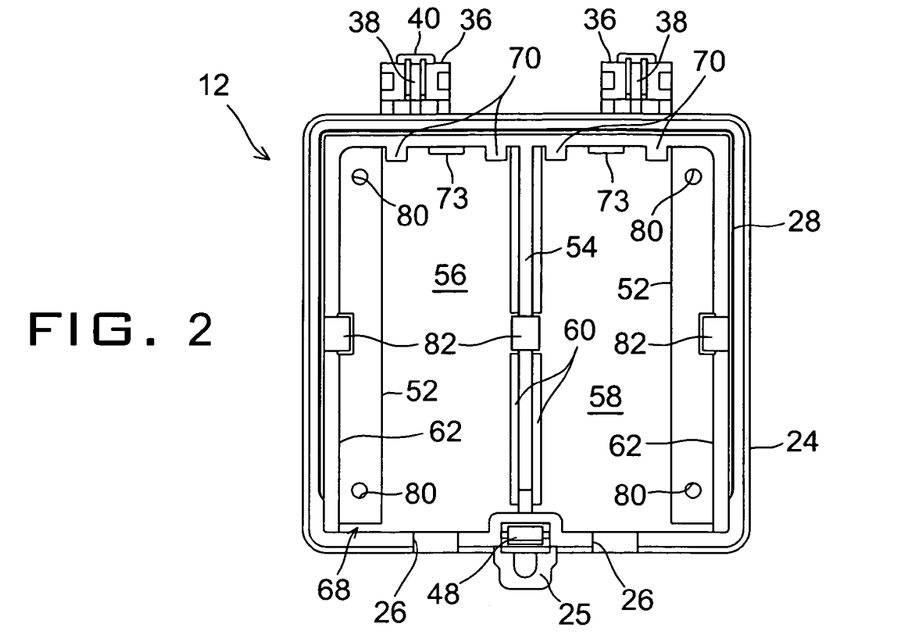
FIG. 2 is a front view of a main body of the enclosure of FIG. 1 before assembly with the hinge cover and slider plates.

With reference to FIGS. 1 and 2, a receptacle enclosure 10 with weather protection according to a first embodiment has a main body 12 with a receiving area 14 in a wide scale for accommodating a double gang configuration that is surrounded by four forwardly extending side walls including a top side 16, bottom side 18, and two identical lateral sides 20. The four sidewalls together form a rear rectangular end 22 a front end 24, which is enlarged and chamfered at its front edge. The enlarged front end 24 may have two recesses 26 to ease passages of electric cords leading from the connected electric loads. In addition, a moisture barrier 28 is extending integrally from the three surrounding upper sides 16 and 20 at front end 24 to prevent water from falling into receiving area 14. Bottom side 18 has an eyelet 25 integrally formed for the purpose described below.

Figure 3:
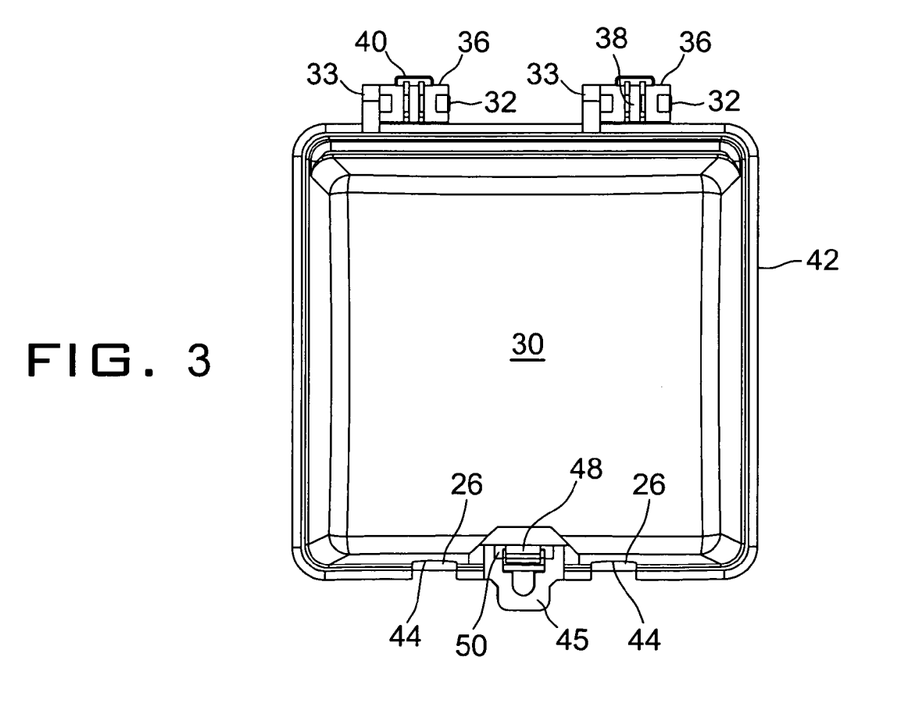
FIG. 3 is a front view of the enclosure of FIG. 3 with the cover hinged at the top and latched onto the bottom of the main body.

In order to protect a set of receptacles for connecting various appliances in main body 12, a cover 30 is provided with an ample internal space for accommodating small and large corded plugs (not shown) of appliances and is attached to body 12 through a couple of concentric pivot pins 32, as in FIG. 3. Both pivot pins 32 may be formed integral to cover 30 through upright legs 33 facing the same side and have middle neck sections 34, respectively. In cooperation with pivot pins 32, hinge portions 36 are formed on top side 16 of main body 12 and include snap bars 38 occupying the respective middle sections which are suspended firmly by bridges 40 so that snap bars 38 are resiliently protrude into neck portions 34 of pivot pins 32 keeping pins 32 within hinge portions 36. So, cover 30 may reliably swing open upwardly allowing a full access to receiving area 14. Cover 30 has a skirt 42 shaped to precisely wrap around front end 24 of main body 12 for closing the internal receiving area 14 to block weather elements. Cover 30 also has two distanced wickets 44 at its lower side as shown in the bottom view of FIG. 4 to permit passages of cords leading from the electric loads connected.

Inside of main body 12, lateral sides 20 have two opposite longitudinal side rails 52 extending inwardly from rear end 22. For this embodiment of double gang wide enclosure 10, a longitudinal spine 54 extends in the center of receiving area 14 between top and bottom sides 16, 18 to partition receiving area 14 into a left slot 56 and right slot 58 for two separate receptacles. On each side of spine 54 are rail segments 60 that cooperate with opposing side rail 52 to form a sliding channel 62 in each of left and right slots 56, 58 to guide introduction and positioning of slider plates 64a and 64b for intimately covering each receptacle selected.

Of the entire enclosure 10, main body 12 and slider plates 64a, 64b may be of molded plastic or nylon and made available in an assortment of colors. One of slider plates 64a and 64b may be generally formed to have a mirror image to the other. Alternatively, in a single gang configuration, each slider plate may be slightly modified to be symmetrical about its own longitudinal centerline which will be described in a second embodiment to follow. Cover 30 is typically molded of clear type of plastic to permit users to see what receptacles or switches are under the enclosure.

Face plate 64a shown at the left in the drawing FIG. 1 is yet to slide in left slot 56 while symmetrically shaped face plate 64b is seated in right slot 58 through a lower entrance 68 formed in part by rails 52 and 60. Slider plate 64b at right is locked in place by a pair of press tabs 70 depending from top side 16 for each of the slots 56 and 58. To complement the protrusions of tabs 70, slider plates 64a, 64b each has recesses 72 at the corresponding areas near the top. A rear tab 73 is formed in the middle of each pair of press tabs 70 in order to support a tighter fitting of slider plates 64a, 64b with main body 12.

Figure 4:
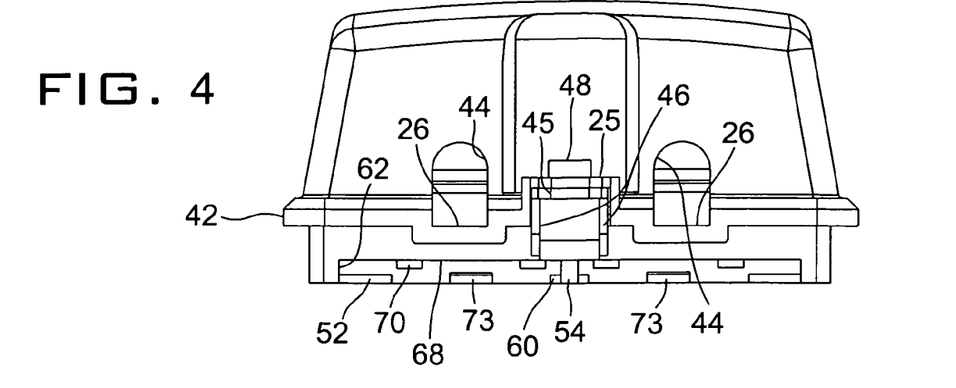
Figures 5, 6:
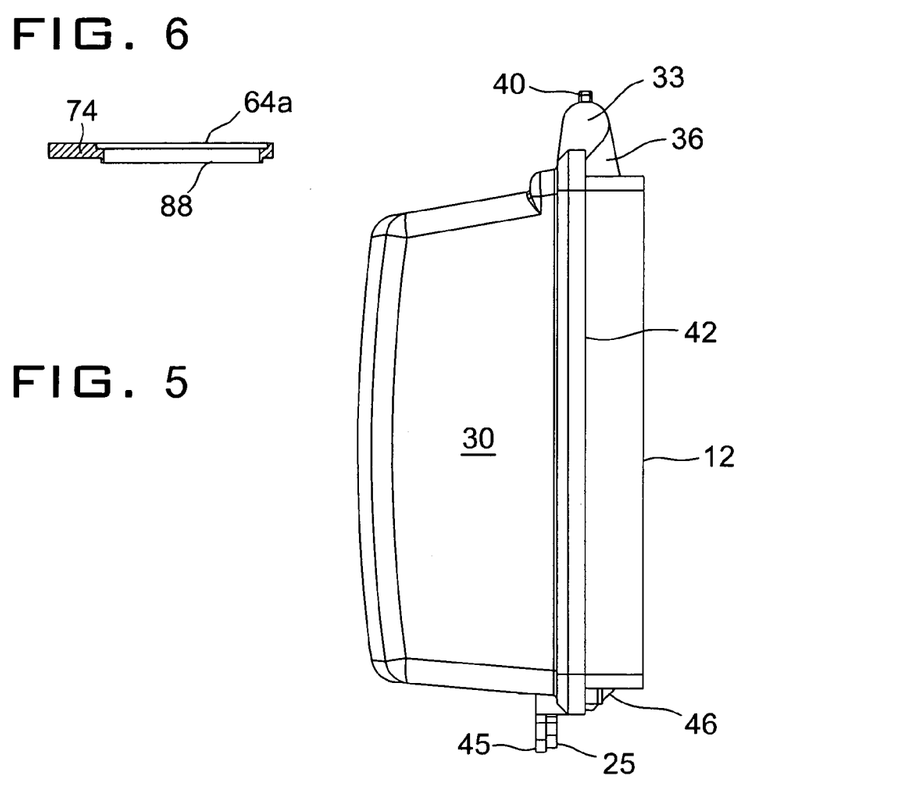
FIG. 5 is a detail right side view of the enclosure of FIG. 4 to show the cover hinge and latch.
FIG. 6 is a cross sectional view of the released slider plate taken along line 6-6 of FIG. 1.

Slide plates 64a, 64b each has two opposite side edges 74 slightly shifted toward the front surface and a main middle portion 75 withdrawn backward to provide a cross section shown in FIG. 6 that matches sliding channel 62 as shown in FIG. 4. This asymmetrical contour of slide plates 64a, 64b assures their correct introductions to main body 12 every time with the right sides of parts meeting up during assembly.

Slides plates 64a, 64b may be attached to main body 12 through auxiliary screw holes 76 and in turn wall receptacles through primary screw holes 78. At corresponding locations to auxiliary screw holes 76, side rails 52 of main body 12 have thru holes 80.

Midway tabs 82 formed on main body 12 protruding into slots 56, 58 further suppress the middle portion of raised edges 74 of slider plates 64a, 64b when they are assembled with main body 12. Raised edges 74 also have a tiny stop bump 84 formed at the trailing side opposite from recesses 72 to ride over bottom side 18 of main body 12 at the lower entrance 68 and lock slider plates 64a, 64b in place. Slider plates 64a, 64b have integral grasp bars 86 at the other side of bump 84 for a user to grasp. Grasp bars 86 also assist in correctly positioning slide plates 64a, 64b to assemble them with the recesses 72 facing fore and up toward lower entrance 68 of main body 12.

Slider plates 64a, 64b as shown respectively include matching holes 88 to conventional standard apertures of face plates for typical duplex receptacles (not shown). Besides duplex slider plates 64a, 64b, modular toggle switch plates and GFCI plates are more frequently used but these and other receptacle types are omitted from the drawings for this embodiment simplicity. In the back of main body 12, an optional rubber gasket 90 including knock out patterns (not shown) after a group of receptacles may be interposed between the construction wall to enhance the sealing fitness.

Figure 7:
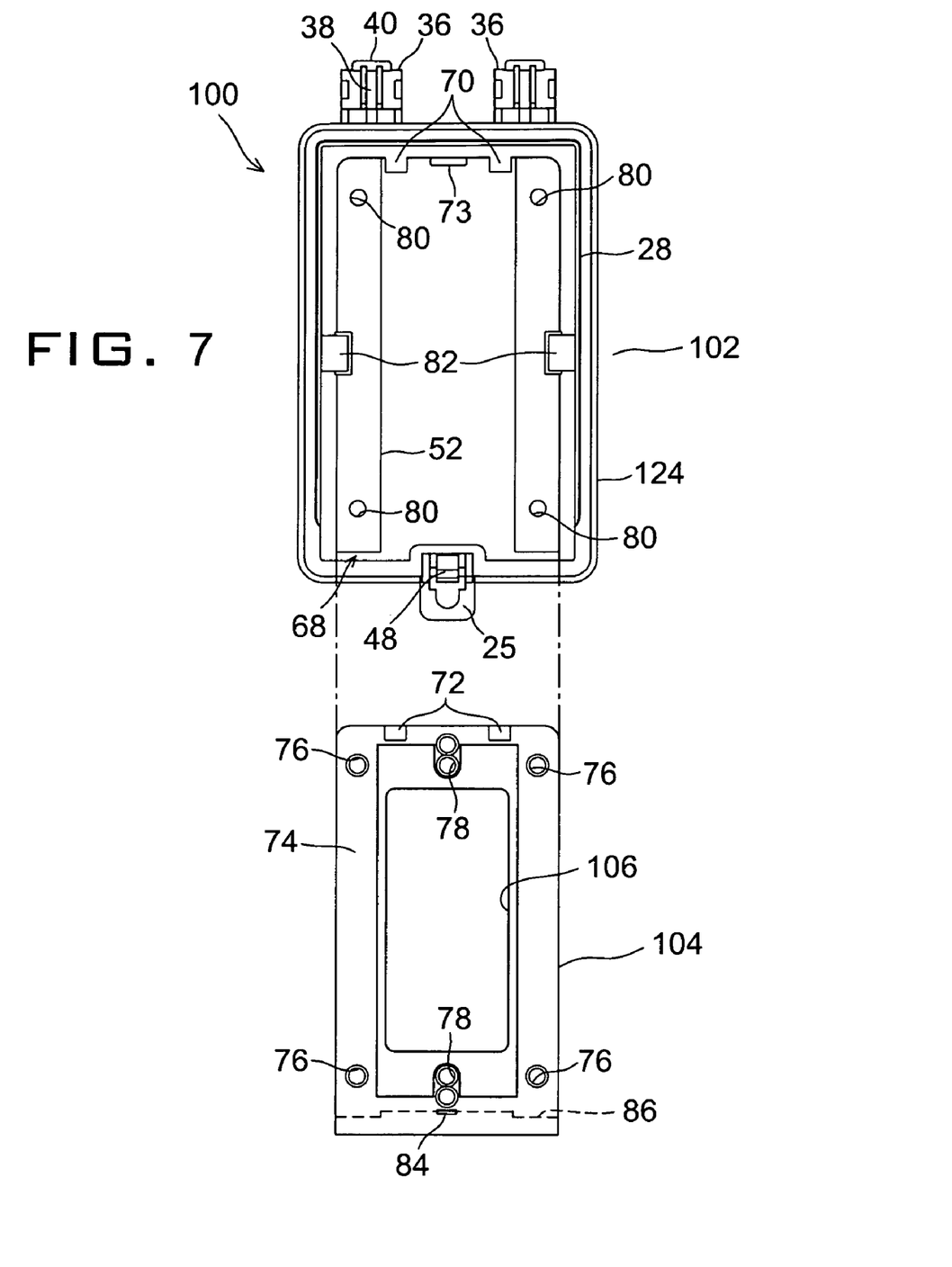
FIG. 7 is an exploded front view similar to FIG. 2 for showing a one gang weatherproof outlet enclosure and an adapted slider plate according to a second embodiment of the present invention.

FIG. 7 illustrates a one-gang weatherproof outlet enclosure 100 comprising a main body 102 and a GFCI slider plate 104 according to a second embodiment of the present invention. This enclosure body 102 is similar to main body 12 of the double gang type except that it has no center spine but two lateral sides drawn close to each other to accommodate only the single slider plate 104. Main body 102 has a similarly shaped front end 124, too. Accordingly, slider plate 104 may be perfectly symmetrical about a longitudinal centerline thereof. To accommodate a GFCI receptacle, slider plate 104 has a large rectangular opening 106 in the middle. The identically numbered parts function exactly same way as described with other drawings.

With the slider plates 64a, 64b, 104 of the present invention, a gentle sliding in or out of the main body 12, 102 followed by the single point stop at bump 84 will provide the quickest possible as well as easy configuration of face plates during installation.

Installing the in-use weatherproof enclosure 10, of the present invention starts with typical electrical job procedure of disconnecting the main power and removing the existing cover, plate and gasket. The rest is intuitive throughout identifying the right slider plate 64a, 64b, 104 and hold it by grasp bar 86 to slide into the main body 12, 102. The gasket 90 may be optionally interposed after adjustment to have appropriate openings corresponding to the plate. Then, the base/plate assembly is fastened to the outdoor junction box or FS box using two long screws. Extra screws may be used at all four corner holes 80 through screw holes 76 of the slider plates for further security. For specially designed junction boxes, mounting holes may be drilled through raised edges 74 of the slider plates and side rails 52 of the main body to line up with the holes in the box. Short screws are tightened through the remaining holes of base and/or plate into the receptacle to complete the installation. Protection of the receptacle is effective as soon as the cover 30 is brought into engagement with the hinge portion 36 of the main body 12, 102 and its latch 48 resiliently clicks onto step 50 of cover 30.

Figure 8:
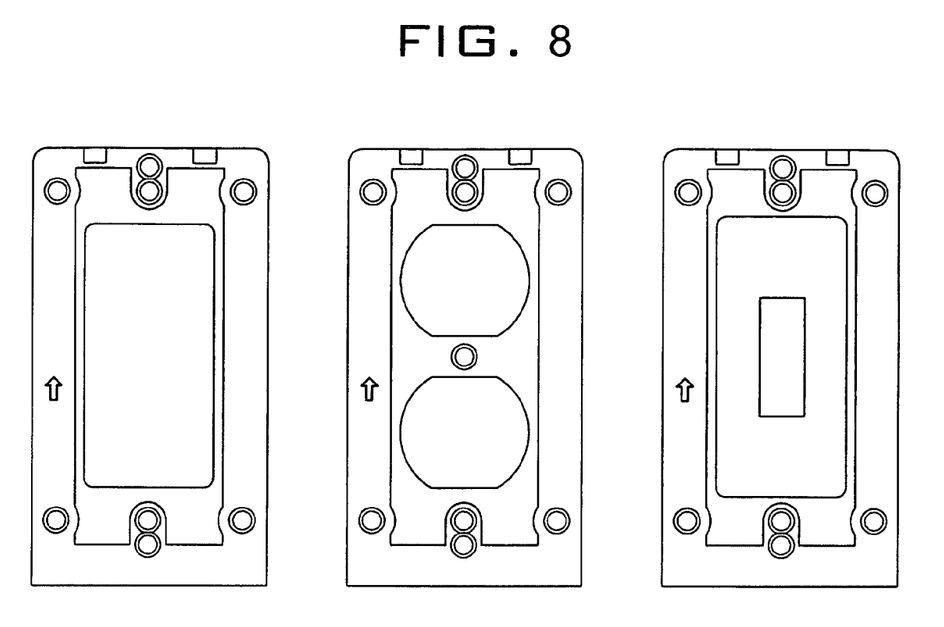
FIG. 8 is a diagram of the slider plates of the one gang weatherproof enclosure.
Figure 9:
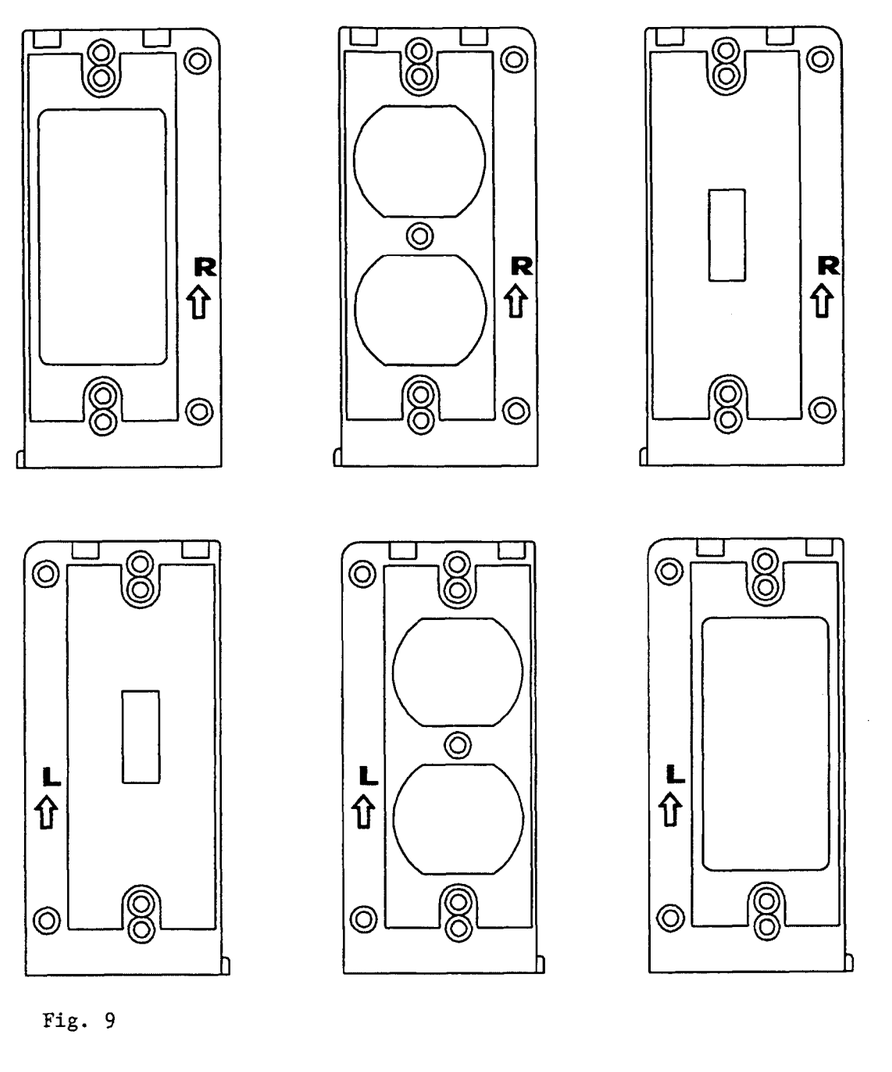
FIG. 9 is a diagram of the slider plates of the two gang weatherproof enclosure.

The slider plate selection FIG. 8 shows three slider plates. The slider plates can be a typical outlet such as a decorator, duplex or toggle. The one gang weatherproof enclosure can use any one of the three slider plates, and the double gang weatherproof enclosure can use any one of the three slider plates in any one of the two slots.

Therefore, while the presently preferred form of the weatherproof enclosure has been shown and described, and several modifications thereof discussed, persons skilled in this art will readily appreciate that various additional changes and modifications may be made without departing from the spirit of the invention, as defined and differentiated by the following claims.

The invention claimed is:

1. A weatherproof outlet enclosure for connections between a number of electrical outlets and various electric loads comprising:
   at least one rectangular slider plate having a front and rear surface, openings in its middle area for allowing access from the front surface to the electrical outlets and a click stop integrally formed on the slider plate;
   a base plate for slidably accommodating a predetermined number of the slider plates which are held in position by the click stop, wherein the base plate is vertically elongated, the base plate including four-sided rectangular walls which form a generally rectangular opening; at least one channel for guiding the slider plate; a rear rectangular edge lying flush on a flat wall surrounding the outlets and an opposite rectangular edge facing forward; and
   a cover having a hinged attachment to one of the side walls of the base plate and a latching connection with an opposite location of the side walls from the hinged attachment, the cover also having an ascended position to allow access to the slider plate and thus the electrical outlets and a lower latched position to enclose the electrical outlets leaving passages for cords leading from the electric loads connected, wherein the slider plate is introduced into the base plate at a lower side of the four-sided rectangular walls.

2. A weatherproof outlet enclosure for connections between a number of electrical outlets and various electric loads comprising:
   at least one rectangular slider plate having a front and rear surface, openings in its middle area for allowing access from the front surface to the electrical outlets and a click stop integrally formed on the slider plate;
   a base plate for slidably accommodating a predetermined number of the slider plates which are held in position by the click stop, wherein the base plate is vertically elongated, the base plate including four-sided rectangular walls which form a generally rectangular opening; at least one channel for guiding the slider plate; a rear rectangular edge lying flush on a flat wall surrounding the outlets and an opposite rectangular edge facing forward; and a cover having a hinged attachment to one of the side walls of the base plate and a latching connection with an opposite location of the side walls from the hinged attachment, the cover also having an ascended position to allow access to the slider plate and thus the electrical outlets and a lower latched position to enclose the electrical outlets leaving passages for cords leading from the electric loads connected, wherein the slider plate has a grasp bar formed on the rear surface at the trailing edge to correctly hold the slider plate for pushing it up into the main body and a positional indicator consisting of the two opposite side edges slightly shifted toward the front surface with respect to a main middle portion to provide a deflected cross section that fits with the main body in one side only.

3. A weatherproof outlet enclosure for connections between a number of electrical outlets and various electric loads comprising:
at least one rectangular slider plate having a front and rear surface, openings in its middle area for allowing access from the front surface to the electrical outlets and a click stop integrally formed on the slider plate; a base plate for slidably accommodating a predetermined number of the slider plates which are held in position by the click stop, wherein the base plate is vertically elongated, the base plate including four-sided rectangular walls which form a generally rectangular opening; at least one channel for guiding the slider plate; a rear rectangular edge lying flush on a flat wall surrounding the outlets and an opposite rectangular edge facing forward; and a cover having a hinged attachment to one of the side walls of the base plate and a latching connection with an opposite location of the side walls from the hinged attachment, the cover also having an ascended position to allow access to the slider plate and thus the electrical outlets and a lower latched position to enclose the electrical outlets leaving passages for cords leading from the electric loads connected, further comprising midway tabs formed on the base plate protruding into the at least one channel for further suppressing a middle portion of raised edges of slider plates when assembled with the at least one channel.

4. A weatherproof outlet enclosure for connections between a number of electrical outlets and various electric loads comprising: at least one rectangular slider plate having a front and rear surface, openings in its middle area for allowing access from the front surface to the electrical outlets and a click stop integrally formed on the slider plate; a base plate for slidably accommodating a predetermined number of the slider plates which are held in position by the click stop, wherein the base plate is vertically elongated, the base plate including four-sided rectangular walls which form a generally rectangular opening; at least one channel for guiding the slider plate; a rear rectangular edge lying flush on a flat wall surrounding the outlets and an opposite rectangular edge facing forward; and a cover having a hinged attachment to one of the side walls of the base plate and a latching connection with an opposite location of the side walls from the hinged attachment, the cover also having an ascended position to allow access to the slider plate and thus the electrical outlets and a lower latched position to enclose the electrical outlets leaving passages for cords leading from the electric loads connected, wherein the slider plate is introduced into the base plate at a lower side of the four-sided rectangular walls, and wherein the base plate further comprises four corner holes for receiving screws.

5. A weatherproof outlet enclosure for connections between a number of electrical outlets and various electric loads comprising: at least one rectangular slider plate having a front and rear surface, openings in its middle area for allowing access from the front surface to the electrical outlets and a click stop integrally formed on the slider plate; a base plate for slidably accommodating a predetermined number of the slider plates which are held in position by the click stop, wherein the base plate is vertically elongated, the base plate including four-sided rectangular walls which form a generally rectangular opening; at least one channel for guiding the slider plate; a rear rectangular edge lying flush on a flat wall surrounding the outlets and an opposite rectangular edge facing forward; and a cover having a hinged attachment to one of the side walls of the base plate and a latching connection with an opposite location of the side walls from the hinged attachment, the cover also having an ascended position to allow access to the slider plate and thus the electrical outlets and a lower latched position to enclose the electrical outlets leaving passages for cords leading from the electric loads connected, wherein the slider plate has flat opposite side edges for making a parallel sliding assembly with the channel of the base plate and distinctive leading and trailing edges spanning the side edges, wherein the slider plate is introduced into the base plate at a lower side of the four-sided rectangular walls.

6. A weatherproof outlet enclosure for connections between a number of electrical outlets and various electric loads comprising: at least one rectangular slider plate having a front and rear surface, openings in its middle area for allowing access from the front surface to the electrical outlets and a click stop integrally formed on the slider plate; a base plate for slidably accommodating a predetermined number of the slider plates which are held in position by the click stop, wherein the base plate is vertically elongated, the base plate including four-sided rectangular walls which form a generally rectangular opening; at least one channel for guiding the slider plate; a rear rectangular edge lying flush on a flat wall surrounding the outlets and an opposite rectangular edge facing forward; and a cover having a hinged attachment to one of the side walls of the base plate and a latching connection with an opposite location of the side walls from the hinged attachment, the cover also having an ascended position to allow access to the slider plate and thus the electrical outlets and a lower latched position to enclose the electrical outlets leaving passages for cords leading from the electric loads connected, wherein the slider plate has a grasp bar formed on the rear surface at the trailing edge to correctly hold the slider plate for pushing it up into the main body and a positional indicator consisting of the two opposite side edges slightly shifted toward the front surface with respect to a main middle portion to provide a deflected cross section that fits with the main body in one side only, further comprising midway tabs formed on the base plate protruding into the at least one channel for further suppressing a middle portion of raised edges of slider plates when assembled with the at least one channel.

7. A weatherproof outlet enclosure for connections between a number of electrical outlets and various electric loads comprising: at least one rectangular slider plate having a front and rear surface, openings in its middle area for allowing access from the front surface to the electrical outlets and a click stop integrally formed on the slider plate; a base plate for slidably accommodating a predetermined number of the slider plates which are held in position by the click stop, wherein the base plate is vertically elongated, the base plate including four-sided rectangular walls which form a generally rectangular opening; at least one channel for guiding the slider plate; a rear rectangular edge lying flush on a flat wall surrounding the outlets and an opposite rectangular edge facing forward; and a cover having a hinged attachment to one of the side walls of the base plate and a latching connection with an opposite location of the side walls from the hinged attachment, the cover also having an ascended position to allow access to the slider plate and thus the electrical outlets and a lower latched position to enclose the electrical outlets leaving passages for cords leading from the electric loads connected, wherein the slider plate is introduced into the base plate at a lower side of the four-sided rectangular walls, and wherein the base plate further comprises four corner holes for receiving screws, wherein the slider plate has a plurality of auxiliary screw holes that line up with at least one of four corner holes when the slider plate is introduced into the base plate.

8. A weatherproof outlet enclosure for connections between a number of electrical outlets and various electric loads comprising: at least one rectangular slider plate having a front and rear surface, openings in its middle area for allowing access from the front surface to the electrical outlets and a click stop integrally formed on the slider plate; a base plate for slidably accommodating a predetermined number of the slider plates which are held in position by the click stop, wherein the base plate is vertically elongated, the base plate including four-sided rectangular walls which form a generally rectangular opening; at least one channel for guiding the slider plate; a rear rectangular edge lying flush on a flat wall surrounding the outlets and an opposite rectangular edge facing forward; and a cover having a hinged attachment to one of the side walls of the base plate and a latching connection with an opposite location of the side walls from the hinged attachment, the cover also having an ascended position to allow access to the slider plate and thus the electrical outlets and a lower latched position to enclose the electrical outlets leaving passages for cords leading from the electric loads connected, wherein the slider plate has a grasp bar formed on the rear surface at the trailing edge to correctly hold the slider plate for pushing it up into the main body and a positional indicator consisting of the two opposite side edges slightly shifted toward the front surface with respect to a main middle portion to provide a deflected cross section that fits with the main body in one side only, further comprising midway tabs formed on the base plate protruding into the at least one channel for further suppressing a middle portion of raised edges of slider plates when assembled with the at least one channel, wherein the slider plate is introduced into the base plate at a lower side of the four-sided rectangular walls, and wherein the base plate further comprises four corner holes for receiving screws, wherein the slider plate has a plurality of auxiliary screw holes that line up with at least one of four corner holes when the slider plate is introduced into the base plate.

9. A weatherproof outlet enclosure for connections between a number of electrical outlets and various electric loads comprising: at least one rectangular slider plate having a front and rear surface, openings in its middle area for allowing access from the front surface to the electrical outlets and a click stop integrally formed on the slider plate; a base plate for slidably accommodating a predetermined number of the slider plates which are held in position by the click stop, the base plate including four-sided rectangular walls which form a generally rectangular opening; at least one channel for guiding the slider plate; and a cover having a hinged attachment to one of the side walls of the base plate and a latching connection with an opposite location of the side walls from the hinged attachment, the cover also having an ascended position to allow access to the slider plate and thus the electrical outlets and a lower latched position to enclose the electrical outlets leaving passages for cords leading from the electric loads connected, wherein the slider plate has a grasp bar formed on the rear surface at the trailing edge to correctly hold the slider plate for pushing it up into the main body and a positional indicator consisting of the two opposite side edges slightly shifted toward the front surface with respect to a main middle portion to provide a deflected cross section that fits with the main body in one side only.

10. A weatherproof outlet enclosure for connections between a number of electrical outlets and various electric loads comprising: at least one rectangular slider plate having a front and rear surface, openings in its middle area for allowing access from the front surface to the electrical outlets and a click stop integrally formed on the slider plate; a base plate for slidably accommodating a predetermined number of the slider plates which are held in position by the click stop, the base plate including four-sided rectangular walls which form a generally rectangular opening; at least one channel for guiding the slider plate; and a cover having a hinged attachment to one of the side walls of the base plate and a latching connection with an opposite location of the side walls from the hinged attachment, the cover also having an ascended position to allow access to the slider plate and thus the electrical outlets and a lower latched position to enclose the electrical outlets leaving passages for cords leading from the electric loads connected, further comprising midway tabs formed on the base plate protruding into the at least one channel for further suppressing a middle portion of raised edges of slider plates when assembled with the at least one channel.

11. A weatherproof outlet enclosure for connections between a number of electrical outlets and various electric loads comprising: at least one rectangular slider plate having a front and rear surface, openings in its middle area for allowing access from the front surface to the electrical outlets and a click stop integrally formed on the slider plate; a base plate for slidably accommodating a predetermined number of the slider plates which are held in position by the click stop, the base plate including four-sided rectangular walls which form a generally rectangular opening; at least one channel for guiding the slider plate; and a cover having a hinged attachment to one of the side walls of the base plate and a latching connection with an opposite location of the side walls from the hinged attachment, the cover also having an ascended position to allow access to the slider plate and thus the electrical outlets and a lower latched position to enclose the electrical outlets leaving passages for cords leading from the electric loads connected, wherein the slider plate is introduced into the base plate at a lower side of the four-sided rectangular walls, and wherein the base plate further comprises four corner holes for receiving screws.

12. A weatherproof outlet enclosure for connections between a number of electrical outlets and various electric loads comprising: at least one rectangular slider plate having a front and rear surface, openings in its middle area for allowing access from the front surface to the electrical outlets and a click stop integrally formed on the slider plate; a base plate for slidably accommodating a predetermined number of the slider plates which are held in position by the click stop, the base plate including four-sided rectangular walls which form a generally rectangular opening; at least one channel for guiding the slider plate; and a cover having a hinged attachment to one of the side walls of the base plate and a latching connection with an opposite location of the side walls from the hinged attachment, the cover also having an ascended position to allow access to the slider plate and thus the electrical outlets and a lower latched position to enclose the electrical outlets leaving passages for cords leading from the electric loads connected, wherein the slider plate has flat opposite side edges for making a parallel sliding assembly with the channel of the base plate and distinctive leading and trailing edges spanning the side edges, wherein the slider plate is introduced into the base plate at a lower side of the four-sided rectangular walls.

13. A weatherproof outlet enclosure for connections between a number of electrical outlets and various electric loads comprising: at least one rectangular slider plate having a front and rear surface, openings in its middle area for allowing access from the front surface to the electrical outlets and a click stop integrally formed on the slider plate; a base plate for slidably accommodating a predetermined number of the slider plates which are held in position by the click stop, the base plate including four-sided rectangular walls which form a generally rectangular opening; at least one channel for guiding the slider plate; and a cover having a hinged attachment to one of the side walls of the base plate and a latching connection with an opposite location of the side walls from the hinged attachment, the cover also having an ascended position to allow access to the slider plate and thus the electrical outlets and a lower latched position to enclose the electrical outlets leaving passages for cords leading from the electric loads connected, wherein the slider plate has a grasp bar formed on the rear surface at the trailing edge to correctly hold the slider plate for pushing it up into the main body and a positional indicator consisting of the two opposite side edges slightly shifted toward the front surface with respect to a main middle portion to provide a deflected cross section that fits with the main body in one side only, further comprising midway tabs formed on the base plate protruding into the at least one channel for further suppressing a middle portion of raised edges of slider plates when assembled with the at least one channel.

14. A weatherproof outlet enclosure for connections between a number of electrical outlets and various electric loads comprising: at least one rectangular slider plate having a front and rear surface, openings in its middle area for allowing access from the front surface to the electrical outlets and a click stop integrally formed on the slider plate; a base plate for slidably accommodating a predetermined number of the slider plates which are held in position by the click stop, the base plate including four-sided rectangular walls which form a generally rectangular opening; at least one channel for guiding the slider plate; and a cover having a hinged attachment to one of the side walls of the base plate and a latching connection with an opposite location of the side walls from the hinged attachment, the cover also having an ascended position to allow access to the slider plate and thus the electrical outlets and a lower latched position to enclose the electrical outlets leaving passages for cords leading from the electric loads connected, wherein the slider plate is introduced into the base plate at a lower side of the four-sided rectangular walls, and wherein the base plate further comprises four corner holes for receiving screws, wherein the slider plate has a plurality of auxiliary screw holes that line up with at least one of four corner holes when the slider plate is introduced into the base plate.

15. A weatherproof outlet enclosure for connections between a number of electrical outlets and various electric loads comprising: at least one rectangular slider plate having a front and rear surface, openings in its middle area for allowing access from the front surface to the electrical outlets and a click stop integrally formed on the slider plate; a base plate for slidably accommodating a predetermined number of the slider plates which are held in position by the click stop, the base plate including four-sided rectangular walls which form a generally rectangular opening; at least one channel for guiding the slider plate; and a cover having a hinged attachment to one of the side walls of the base plate and a latching connection with an opposite location of the side walls from the hinged attachment, the cover also having an ascended position to allow access to the slider plate and thus the electrical outlets and a lower latched position to enclose the electrical outlets leaving passages for cords leading from the electric loads connected, wherein the slider plate has a grasp bar formed on the rear surface at the trailing edge to correctly hold the slider plate for pushing it up into the main body and a positional indicator consisting of the two opposite side edges slightly shifted toward the front surface with respect to a main middle portion to provide a deflected cross section that fits with the main body in one side only, further comprising midway tabs formed on the base plate protruding into the at least one channel for further suppressing a middle portion of raised edges of slider plates when assembled with the at least one channel, wherein the slider plate is introduced into the base plate at a lower side of the four-sided rectangular walls, and wherein the base plate further comprises four corner holes for receiving screws, wherein the slider plate has a plurality of auxiliary screw holes that line up with at least one of four corner holes when the slider plate is introduced into the base plate.

\* \* \* \* \*